US006976287B2

(12) United States Patent
Muth

(10) Patent No.: US 6,976,287 B2
(45) Date of Patent: *Dec. 20, 2005

(54) VACUUM NOZZLE APPARATUS

(76) Inventor: Gordon E. Muth, R.R.#1, Box 1031, Sylvan Lake, Alberta (CA) T4S 1X6

( * ) Notice: Subject to any disclaimer, the term of this patent is extended or adjusted under 35 U.S.C. 154(b) by 296 days.

This patent is subject to a terminal disclaimer.

(21) Appl. No.: 10/301,855

(22) Filed: Nov. 22, 2002

(65) Prior Publication Data
US 2004/0098824 A1 May 27, 2004

(51) Int. Cl.⁷ .......................... A47L 11/30; E01H 1/08
(52) U.S. Cl. ...................................... 15/340.1; 15/320
(58) Field of Search ............................. 15/320, 340.1, 15/340.2, 340.3, 340.4, 246.4; 180/6.48, 180/6.5, 333

(56) References Cited

U.S. PATENT DOCUMENTS

| 1,935,158 | A | * | 11/1933 | Lumley | 15/319 |
| 4,354,569 | A | * | 10/1982 | Eichholz | 180/211 |
| 4,520,893 | A | * | 6/1985 | Keough | 180/326 |
| 4,538,695 | A | * | 9/1985 | Bradt | 180/19.2 |
| 4,643,776 | A | * | 2/1987 | Hollowell et al. | 134/21 |
| 5,746,282 | A | * | 5/1998 | Fujiwara et al. | 180/6.2 |
| 5,842,532 | A | * | 12/1998 | Fox et al. | 180/6.48 |
| 5,983,447 | A | * | 11/1999 | Boomgaarden | 15/354 |
| 6,095,267 | A | * | 8/2000 | Goodman | 180/6.5 |
| 6,355,112 | B1 | * | 3/2002 | Bartholmey et al. | 134/21 |
| 6,805,218 | B2 | * | 10/2004 | Wakitani et al. | 180/315 |
| 2005/0125938 | A1 | * | 6/2005 | Muth | 15/340.1 |

* cited by examiner

Primary Examiner—Terrence R. Till
(74) Attorney, Agent, or Firm—Adrian D. Battison; Michael R. Williams; Ryan W. Dupuis

(57) ABSTRACT

A cart for use in moving a large vacuum nozzle such as that of a grain vacuum within a grain bin has a frame mounted on two pairs of ground wheels. The pipe of the nozzle extends along a center of the cart with a foot pad on each side for the operator to ride and a nozzle of the pipe projecting from the front of the cart. The cart is driven by a pair of motors extending across the cart each driving a respective pair of wheels the motors being mounted underneath the pipe with one in front of the other. A manually operable control in the form of an upstanding support bar is carried on front of the frame and operable by the operator with two switches operable to control the motors separately for forward and rearward movement of the cart and steering movements of the cart to each side for guiding the cart and the nozzle over the surface.

19 Claims, 2 Drawing Sheets

VACUUM NOZZLE APPARATUS

FIELD OF THE INVENTION

The present invention relates to an apparatus for use in moving a vacuum nozzle over a surface.

BACKGROUND OF THE INVENTION

Vacuums are used for removing grain and other materials from a storage bin. Such vacuums necessarily include a large and heavy pipe and nozzle which must be moved over the floor of the storage bin from place to place to pick up the material to be removed. Up till now no mechanical assistance has been provided which assists the operator in moving the nozzle.

SUMMARY OF THE INVENTION

It is one object of the present invention to provide an apparatus for use in moving a vacuum nozzle over a surface.

According to the present invention there is provided vacuum nozzle apparatus comprising:

a vacuum pipe for having one end for connection to a vacuum source and an outer end;

a nozzle at the outer end of the pipe defining a suction slot into which material is drawn by a suction in the vacuum source for drawing the material through the pipe and into the source for collection;

a transport cart for moving the nozzle and the pipe relative to the vacuum source across a surface from which the material is to be removed by the nozzle while the vacuum source remains at a fixed location;

the cart including:

a frame;

ground wheels for supporting the frame for movement across the surface;

a motor for driving one or more of the ground wheels;

a support on the frame for receiving an operator supported on the frame for movement therewith;

and a manually operable control arrangement carried on the frame and operable by the operator while the operator is carried on the frame, the control arrangement being operable to control forward and rearward movement of the cart and steering movements of the cart to each side for guiding the cart and the nozzle over the surface.

Preferably the cart has four wheels each of which is driven.

Preferably the cart has two wheels on each side where the wheels on one side are commonly driven by a first motor and the wheels on the other side are commonly driven by a second motor such that steering movement of the cart is controlled by differential forward and rearward driving movement of the wheels on the two sides.

Preferably the manually operable control arrangement comprises a pair of switches each for controlling forward and reverse movement of a respective one of the first and second motors.

Preferably the support for the operator comprises a pair of foot pads each for receiving the operator standing on the cart and the manually operable control arrangement comprises an upstanding handle bar at a front of the cart for grasping by the standing operator.

Preferably the frame defines a support for the pipe longitudinally of the frame such that a rear end of the pipe is located at a rear end of the frame and the nozzle is carried at a forward end of the pipe in front of the frame.

Preferably the frame defines a pair of foot pads each on a respective side of the pipe on which the operator can stand.

Preferably the frame carries a pair of motors each defining an axis of a drive shaft extending across the frame underneath the channel for the pipe.

Preferably each motor drives a sprocket and chain for driving one of the wheels spaced along the frame from the motor, the frame having a channel on each side of the pipe channel for receiving the chain.

Preferably the motors are electric and a battery for power to the motors is carried on the frame. However other drive systems can be used. As the movement is not intended to be continuous but intermittent, as the material is removed from each location on the floor, the electric power is sufficient for the limited amount of movement required and the motors can be of an inexpensive type designed for limited periodic use.

Preferably the pipe extends along the cart from a rear end at a rear of the cart for connection to a vacuum hose to the nozzle at the front end and wherein the motors are arranged underneath the pipe one in advance of the other.

According to a second aspect of the invention there is provided an apparatus for use with a vacuum nozzle comprising:

a transport cart including:

a frame;

ground wheels for supporting the frame for movement across the surface;

a motor for driving one or more of the ground wheels;

a support on the frame for receiving an operator supported on the frame for movement therewith;

a manually operable control arrangement carried on the frame and operable by the operator while the operator is carried on the frame, the control arrangement being operable to control forward and rearward movement of the cart and steering movements of the cart to each side for guiding the cart and the nozzle over the surface;

and a support member for carrying a vacuum pipe such that the vacuum pipe extends longitudinally of the cart from a rear end for connection to a vacuum hose to a forward end for supporting a nozzle of the vacuum pipe in front of the cart.

BRIEF DESCRIPTION OF THE DRAWINGS

In the accompanying drawings, which illustrate an exemplary embodiment of the present invention.

DETAILED DESCRIPTION

Figure 1:
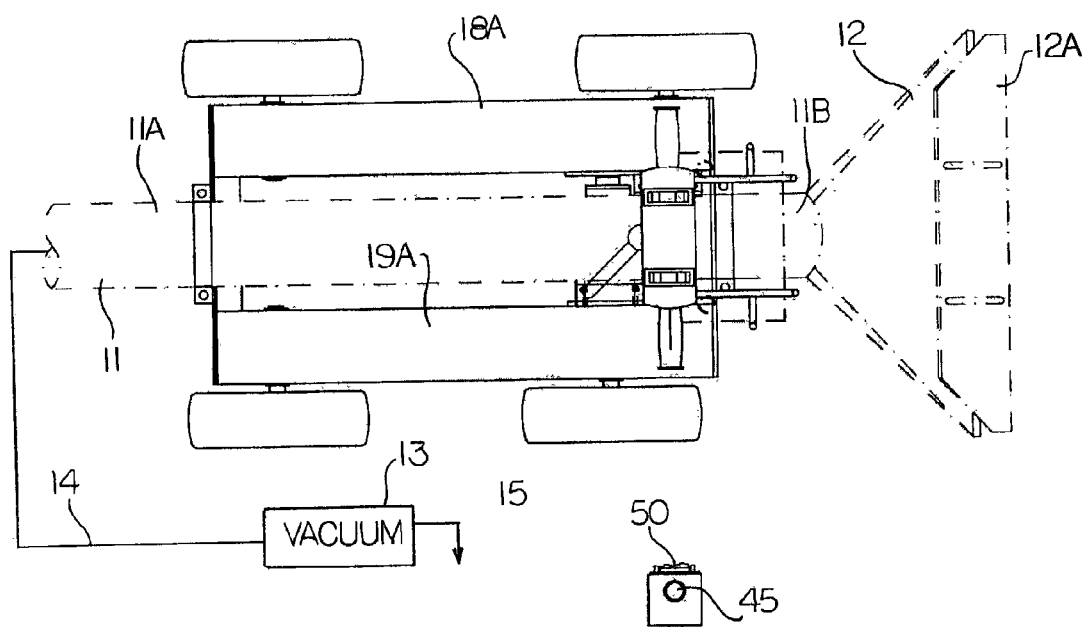
FIG. 1 is a top plan view of one embodiment of the apparatus according to the present invention.
Figure 2:
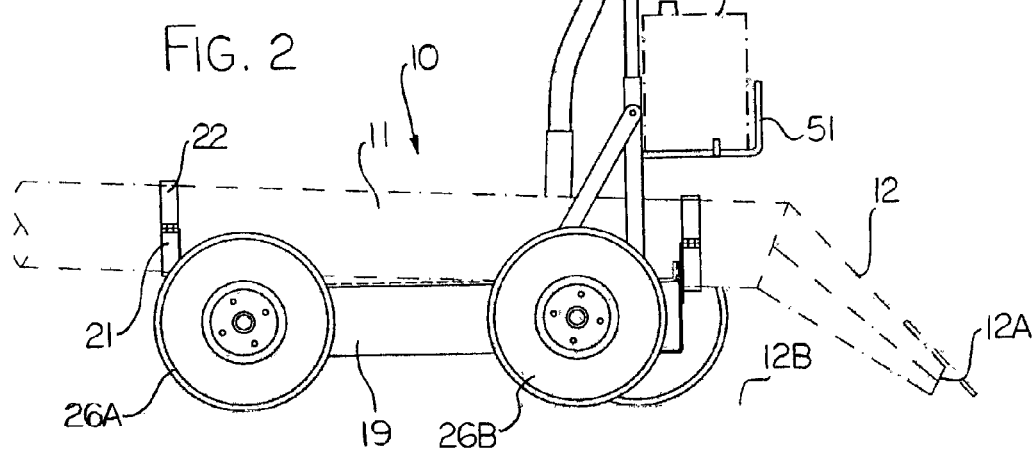
FIG. 2 is a side elevational view of the apparatus of FIG. 1.
Figure 3:
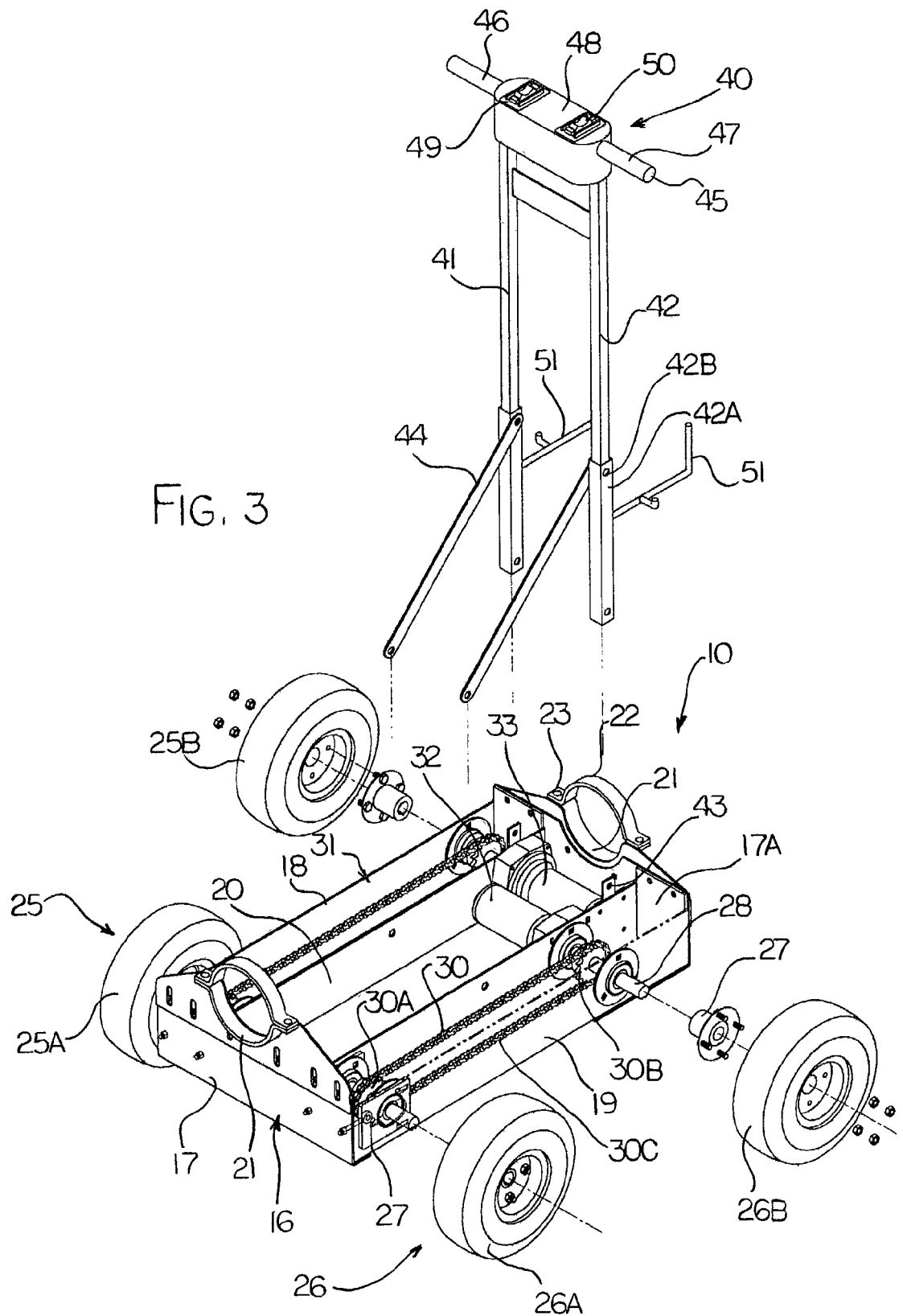
FIG. 3 is an exploded view of the apparatus of FIG. 1.

The apparatus shown in the figures comprises a cart generally indicated at 10 which carries a vacuum pipe 11 and a nozzle 12 in movement of the nozzle over the ground for vacuuming up material on the ground.

The device is primarily designed for use with a conventional grain vacuum generally indicated at 13 which has an inlet hose 14 for transporting particulate material, primarily grain, from a storage bin to a discharge schematically indicated at 15. Such grain vacuums are well known and available from a number of different manufacturers and include a vacuum pump and a separator which extracts the particulate material or grain from the air stream for discharge into a container such as a transportation truck at the discharge 15.

The cart comprises a frame 16 defined by two end plates 17 and 18 connected by longitudinal channels 18 and 19 each at a respective side of the end plates. Between the two channels 18 an 19 is defined an area 20 which receives the pipe 11 so that the pipe is carried longitudinally of the channels and longitudinally of the frame with a rear end 11A of the pipe exposed at the rear end of the frame and a forward end 11B of the pipe exposed at the front of the frame. The pipe is held in place within a semicircular receptacle surface 21 of each of the end plates 17 and 17A by a respective strap 22 which is clamped down onto the end plate by screws 23. Thus the cylindrical pipe is held at its ends at the end plates and extends along the frame within the open channel 20 between the two channel member 18 and 19.

The pipe and nozzle are preferably formed as a part of the cart which is sold to an end user for attachment to the end of the hose of an existing vacuum machine. Thus the cart, if manufactured to include the pipe and nozzle, forms in effect a movable vacuum head which carries the nozzle across the ground. However the cart may also be manufactured without the pipe and nozzle for attachment to an existing pipe and nozzle of an existing vacuum machine. In that case the existing pipe is laid along the central channel 20 and clamped into place.

The frame 16 is mounted on two pairs of ground wheels including a first pair 25 including ground wheels 25A and 25B on one side and the second pair 26 including ground wheels 26A and 26B on the opposite side. The ground wheels are carried on bearings 27 attached to the outside wall of the respective channel 18, 19. Each of the ground wheels is mounted on a respective shaft 28 for driven rotation for causing movement of the frame across the ground. Thus the shaft 28 of the ground wheel 26B is connected to the shaft 28 of the ground wheel 26A by a drive system 30 including a pair of sprockets 30A and 30B and a chain 30C. Thus the pair of ground wheels 26 are both driven at a common speed by the drive system 30 and symmetrically the pair of wheels 25 are also driven by a second drive system 31 arranged symmetrically on the opposite side. The drive system 30 is driven by a motor 32 and the drive system 31 is driven by a motor 33. The motors are mounted across a channel 20 underneath the pipe 11 and suitably supported at the ends of the motor on the inside walls of the channels 18 and 19. Thus the motor 33 is in advance of the motor 32 and arranged in a common horizontal plane with the motor 32 at the front of the frame. The motor 32 includes a drive shaft connected to or common with the drive shaft 28 of the ground wheel 26B. Symmetrically the motor 33 of the drive shaft connected to the wheel 25B and thus as best shown in the top plan view of FIG. 1 the wheel 25B is forward of the wheel 26B.

The channel member 18 an 19 are covered by a foot pad 18A and 19A respectively. Each foot pad has a length equal to the length of the cart and a width sufficient to received the booted foot of an operator so that the foot can be located on the foot pad outside of the pipe 11 and within the ground wheels so as to avoid interfering with the movement of the ground wheels. The foot pads are preferably formed of a slip-resistant metal sheet allowing the operator to readily step into place over the ground wheels and onto the foot pad on either side of the pipe.

On the front of the frame is provided an upstanding handle bar arrangement allowing the operator to hold the handle bar while standing on the foot pads. The handle bar 40 is carried on a pair of upstanding posts 41 and 42 connected at their lower ends to a respective attachment lug 43 at the inside of the respective channel member. The post are braced by downwardly and rearwardly inclined braces 44 which are also connected at their lower ends to a suitable location on the inside of the respective channel member. The height of the posts 41 and 42 can be adjusted by sliding tube-in-tube arrangement as indicated at 42A and locked in place by a pin 42B. At the top of the post is provided a cross bar 45 defining handles 46 and 47 which can be grasped by the hands of the operator while standing on the foot pads. Thus the operator remains stable in place standing on the cart when the cart is moved by operation of the motors. The handle bars include a control unit 48 having a pair of rocker switches 49 and 50 located for operation by the thumb of a respective hand of the operator while the hand remains grasping the respective handle. The rocker switch is of the type defining three positions including a central stop position, a forward tilt position and a rearward tilt position but the rocker switch is being biased to the central stop position. The motors are powered by a battery 70 conveniently carried on a pair of brackets 51 attached to the posts 41 and 42 so as to project forwardly away from the feet of the operator.

The nozzle 12 is attached to the forward end of the pipe 11 so that it extends downwardly and forwardly to a nozzle slot 12A which is located at a height relative to the ground wheels so that the nozzle slot is moved over the ground surface 12B in a vacuuming action.

The switches 49 and 50 are operated by the thumb of the operator either forwardly or rearwardly to effect forward or rearward driving motion of the respective motors and therefore the respective wheels.

The cart is therefore driven by all four wheels and can be driven forwardly by all four wheels to push the nozzle into the material to be lifted. The cart can be moved rearwardly by all four wheels by operating the switches 49 and 50 to the rearward position. The cart can be steered by differential operation of the motors. Steering around a vertical central axis is effected by driving one set of wheels forwardly while the other set drives rearwardly. Thus the cart can be moved readily across the surface 12B to vacuum up all the material within the storage bin.

In general it is necessary to move the cart only periodically since the vacuum action is necessary at a fixed location for a period of time to remove the material at that point. Thus the operator can simply stand in place until the material has been removed sufficiently to allow the cart to be moved forwardly to take up more material. The nozzle 12 has a slot width substantially equal to the width of the cart so that forward movement of the cart into the material vacuums a swath of the material allowing the cart to enter the swath or swept space in the forward moving action. The cart can then be reversed and moved into a second area to vacuum a further swath of the material.

Optionally a valve 60 can be provided at the posts 41 and 42 close to the handle bar so that the valve 60 can be operated by the operator to control the air flow. The air lock valve can operate either the vacuum machine itself or a butterfly or gate-type valve within the pipe 11.

In order for the cart to be readily inserted into a bin, where often access is difficult, the cart can be readily disassembled or folded so that it can be manually lifted into the bin. Thus the pipe is readily disconnectable from the vacuum hose by a conventional clamp locking arrangement commonly used on the suction hose of vacuum devices of this type. Thus the pipe and nozzle arrangement is readily removable from the cart by simply pulling a pin releasing the pipe and nozzle from its mounting on the cart. Thus the bracket 21 may comprise a pinned connection which can be readily released which directly holds the pipe in place against forward and rearward sliding movement in response to pulling or pushing forces on the pipe or nozzle.

In addition the posts 42 and the control system carried thereby can be folded downwardly about a pivot pin at the bottom of the posts allowing the post to fold down in position flat onto the frame between the wheels. Thus the highest point of the structure is the wheels themselves allowing the cart when folded to be inserted readily into a small opening into the bin. The brackets 51 can also be folded downwardly onto the posts or can be readily removed. The battery itself is held in place by a quick connection both electrically and physically so that it can be removed as a separate item for separate transport into the bin, bearing in mind that the battery is relatively heavy.

The cart is formed from aluminium or other suitable lightweight materials allowing it to be readily lifted by the user.

Thus when disassembled, the cart itself can be inserted into the bin, the separate pipe and nozzle inserted into the bin and the battery also carried in the bin for re-assembly within the bin for operation.

While in some cases a fixed nozzle can be suitable, it is also desirable in some cases to provide a floating action of the ground engaging portion of the nozzle and also a height adjustment for the pipe which raises and lowers the nozzle to accommodate uneven ground contours. Thus in an additional embodiment, the nozzle is formed by a horizontal plate forming a top surface of an nozzle with a floating skirt connected to the outside edges of the plate at the sides and rear leaving a front edge open as a slot for drawing in the material to be transported. The skirt is carried on the side edges of the horizontal plate in manner which allows the skirt to float upwardly and downwardly in response to engagement at the bottom edge of the skirt with the ground. Suitable plastics material can be used as the skirt for wear resistance and readily replacement when worn.

In addition where the floating action of the skirt is insufficient to accommodate ground height changes, the height of the forward end of the pipe can be raised and lowered by a lift control mounted at the hand controller 50 on the posts. Thus a simple lever and cable connection can be provided from the top of the mast to the forward end of the pipe at the bottom of the mast allowing the forward end to be raised and lowered relative to a pivot at the rear bracket 21. Thus the user if necessary can raise the pipe thus raising the nozzle either for accommodating changes in ground height for engaging onto the top of a pile of material to be removed.

While one embodiment of the present invention has been described in the foregoing, it is to be understood that other embodiments are possible within the scope of the invention. The invention is to be considered limited solely by the scope of the appended claims.

I claim:

1. A vacuum nozzle apparatus comprising:
   a vacuum pipe for having one end for connection to a vacuum source and an outer end;
   a nozzle at the outer end of the pipe defining a suction slot into which material is drawn by a suction in the vacuum source for drawing the material through the pipe and into the source for collection;
   a transport cart for moving the nozzle and the pipe relative to the vacuum source across a surface from which the material is to be removed by the nozzle while the vacuum source remains at a fixed location separate from said transport cart;
   the cart including;
   a frame;
   ground wheels for supporting the frame for movement across the surface;
   a motor for driving one or more of the ground wheels;
   a support on the frame for receiving an operator supported on the frame for movement therewith;
   and a manually operable control arrangement carried on the frame and operable by the operator while the operator is carried on the frame, the control arrangement being operable to control forward and rearward movement of the cart and steering movements of the cart to each side for guiding the cart and the nozzle over the surface;
   wherein the cart has four wheels each of which is driven.

2. The apparatus according to claim 1 wherein the cart has two wheels on each side where the wheels on one side are commonly driven by a first motor and the wheels on the other side are commonly driven by a second motor such that steering movement of the cart is controlled by differential forward and rearward driving movement of the wheels on the two sides.

3. The apparatus according to claim 2 wherein the manually operable control arrangement comprises a pair of switches each for controlling forward and reverse movement of a respective one of the first and second motors.

4. The apparatus according to claim 1 wherein the support for the operator comprises a pair of foot pads each for receiving the operator standing on the cart.

5. The apparatus according to claim 1 wherein the manually operable control arrangement comprises an upstanding handle bar at a front of the cart for grasping by the standing operator.

6. The apparatus according to claim 1 wherein the frame defines a channel for the pipe longitudinally of the frame such that a rear end of the pipe is located at a rear end of the frame and the nozzle is carried at a forward end of the pipe in front of the frame.

7. The apparatus according to claim 6 wherein the frame carries a pair of motors each defining an axis of a drive shaft extending across the frame underneath the channel for the pipe.

8. The apparatus according to claim 7 wherein each motor drives a sprocket and chain for driving one of the wheels spaced along the frame from the motor, the frame having a channel on each side of the pipe channel for receiving the chain.

9. The apparatus according to claim 7 wherein the motors are electric.

10. The apparatus according to claim 7 wherein the pipe extends along the cart from a rear end at a rear of the cart to the nozzle at the front end and wherein the motors are arranged underneath the pipe one in advance of the other.

11. The apparatus according to claim 1 wherein the frame defines a pair of foot pads each on a respective side of the pipe on which the operator can stand.

12. The apparatus according to claim 1 wherein the nozzle extends downwardly and forwardly from a forward end of the pipe so as to define a nozzle slot in front of the cart for engaging into a material to be collected in front of the cart as the cart moves forwardly and wherein there is provided a lifting mechanism operable by the operator carried on the cart for raising and lowering the pipe with the nozzle attached thereto relative to the cart so as to change a height of the nozzle slot relative to the ground.

13. An apparatus for use with a vacuum nozzle comprising:
   a transport cart including:
      a frame;
      ground wheels for supporting the frame for movement across the surface;
      a motor for driving one or more of the ground wheels;
      a support on the frame for receiving an operator supported on the frame for movement therewith;
      a manually operable control arrangement carried on the frame and operable by the operator while the operator is carried on the frame, the control arrangement being operable to control forward and rearward movement of the cart and steering movements of the cart to each side for guiding the cart and the nozzle over the surface;
      and a support member for carrying a vacuum pipe such that the vacuum pipe extends longitudinally of the cart from a rear end for connection to a vacuum hose to a forward end for supporting a nozzle of the vacuum pipe in front of the cart;
   wherein the cart has two wheels on each side where the wheels on one side are commonly driven by a first motor and the wheels on the other side are commonly driven by a second motor such that steering movement of the cart is controlled by differential forward and rearward driving movement of the wheels on the two sides.

14. The apparatus according to claim 13 wherein the motors are electric.

15. The apparatus according to claim 13 wherein the motors are arranged underneath the pipe one in advance of the other.

16. The apparatus according to claim 13 wherein the support for the operator comprises a pair of foot pads each on a respective side of the pipe for receiving the operator standing on the cart and the manually operable control arrangement comprises an upstanding handle bar at a front of the cart for grasping by the standing operator.

17. The apparatus according to claim 13 wherein each motor drives a sprocket and chain for driving one of the wheels spaced along the frame from the motor, the frame having a channel on each side of the pipe channel for receiving the chain.

18. The apparatus according to claim 13 wherein the nozzle extends downwardly and forwardly from a forward end of the pipe so as to define a nozzle slot in front of the cart for engaging into a material to be collected in front of the cart as the cart moves forwardly and wherein there is provided a lifting mechanism operable by the operator carried on the cart for raising and lowering the pipe with the nozzle attached thereto relative to the cart so as to change a height of the nozzle slot relative to the ground.

19. A vacuum nozzle apparatus comprising:
   a vacuum pipe for having one end for connection to a vacuum source and an outer end;
   a nozzle at the outer end of the pipe defining a suction slot into which material is drawn by a suction in the vacuum source for drawing the material through the pipe and into the source for collection;
   a transport cart for moving the nozzle and the pipe relative to the vacuum source across a surface from which the material is to be removed by the nozzle while the vacuum source remains at a fixed location;
   the cart including:
      a frame;
      ground wheels for supporting the frame for movement across the surface;
      a motor for driving one or more of the ground wheels;
      a support on the frame for receiving an operator supported on the frame for movement therewith;
      and a manually operable control arrangement carried on the frame and operable by the operator while the operator is carried on the frame, the control arrangement being operable to control forward and rearward movement of the cart and steering movements of the cart to each side for guiding the cart and the nozzle over the surface;
   the nozzle extending downwardly and forwardly from a forward end of the pipe so as to define a nozzle slot in front of the cart for engaging into a material to be collected in front of the cart as the cart moves forwardly;
   and a lifting mechanism operable by the operator carried on the cart for raising and lowering the pipe with the nozzle attached thereto relative to the cart so as to change a height of the nozzle slot relative to the ground.

* * * * *